United States Patent [19]

Larsson et al.

[11] Patent Number: 4,735,758
[45] Date of Patent: Apr. 5, 1988

[54] METHOD AND APPARATUS FOR THE MANUFACTURE OF AN INSULATING BODY

[75] Inventors: Mats Larsson; Willy Hartung, both of Laxa, Sweden

[73] Assignee: Laxa Bruks, Sweden

[21] Appl. No.: 7,123

[22] Filed: Jan. 27, 1987

[30] Foreign Application Priority Data

Jan. 27, 1986 [SE] Sweden ................ 8600350

[51] Int. Cl.⁴ ........................... B29C 67/00
[52] U.S. Cl. .................... 264/136; 264/257; 264/296; 264/324
[58] Field of Search ........... 264/137, 257, 296, 324, 264/122, 136

[56] References Cited

U.S. PATENT DOCUMENTS

| | | | |
|---|---|---|---|
| 4,205,032 | 5/1980 | Walters et al. | 264/136 |
| 4,396,561 | 8/1983 | Liebert | 264/122 |
| 4,401,610 | 8/1983 | Öhberg | 264/122 |
| 4,412,880 | 11/1983 | Wintermantel | 264/257 |

Primary Examiner—Frank Sever

[57] ABSTRACT

Method and apparatus for the manufacture of one-dimensional or multi-dimensional curved or angularly formed, preferably moldings of mineral wool, which is impregnated with a binder, in that a matching or chosen piece of binder impregnated mineral wool felt (9) or mineral wool is compressed between mold parts comprising a matrix (4) and a counter die (1), whereafter the matrix (4) and/or the counter die (1) cures the binder of the mineral wool body formed by the matrix and the counter die, whereby the mineral wool felt (9) is compressed in two or several steps, namely in at least a first step between the counter die (1) and a portion (5) of the matrix (4), whereafter the remaining part (6) of the matrix (4) in one or several successive steps is fold or pressed to the mineral wool felt (9), so that all remaining parts thereof are pressed to the counter die (1), whereby all parts of the mineral wool felt (9) is given a predetermined thickness.

5 Claims, 3 Drawing Sheets

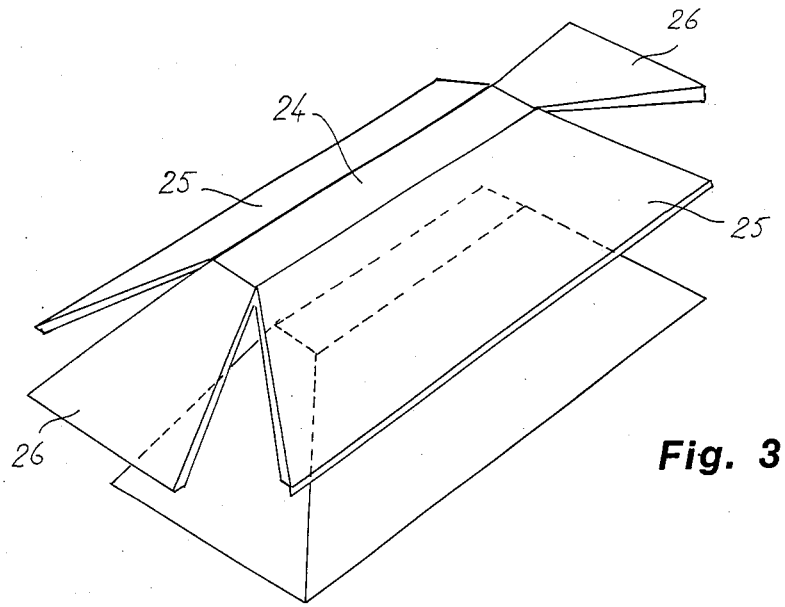
Fig. 3
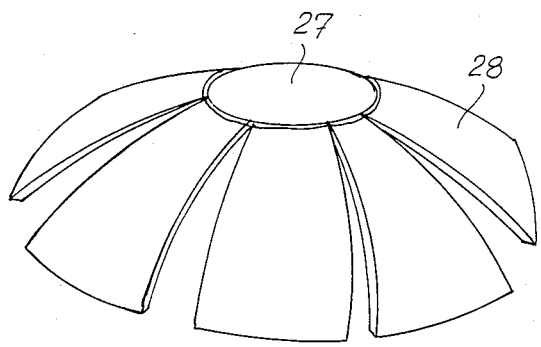
Fig. 4
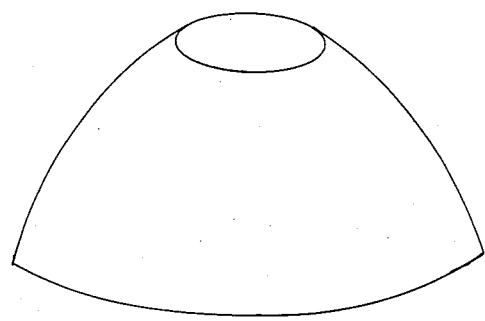

METHOD AND APPARATUS FOR THE MANUFACTURE OF AN INSULATING BODY

The present invention generally relates to a method and an apparatus for the manufacture of insulating bodies, and the invention is more particularly concerned with the manufacture of one-dimensionally or two-dimensionally curved, angularly formed, flute formed or bowl formed insulating bodies of mineral wool which is impregnated with a binder, in that a matching or calculating piece of mineral wool, for instance Rockwood felt, which is impregnated with a binder, it is compressed between two mold parts, comprising a matrix and a counter die whereupon the binder of the mineral wool body formed between said matrix and counter die by means of heat emitted from the matrix and the counter die.

In the following the designation mineral wool will be used for a mineral which partly or completely comprises more or less disarranged substantially integral fibres of inorganic, synthetic materials.

For so called technical insulating etc. shaped bodies of insulating materials are often used. The most typical example is tubular insulating bodies or tube bowls which are used for insulating of tubes. Tube bowls generally are complete, that is that one single shaped body encloses the entire tube. For large tubes tube bowl halves generally are used, and sometimes also still less units are used. Complete tube bowls generally are made in that a layer of mineral wool having a non-fixed binder is wound round a core, and thereafter the mineral wool layer is cured with or without an outer die.

For the manufacture of tube bowl halves and insulating bodies intended for use in isolation of channels having a cross section shape other than a circular shape a form press technics generally is used. Basically said technics is made in that a layer of mineral wool having a non-cured binder is placed between a surrounding die part, a matrix, and a convex die part, a counter die. Mostly the mineral wool is placed between the die parts by hand and this is relatively time consuming and involves substantial costs. The unpressed layer of mineral wool generally has substantially larger thickness than the ready pressed layer, and due thereto it is difficult to provide an even distribution of material, especially in dies which are not plane.

The problems are especially great if the form body is of the half tube bowl type. The layer of wool must be placed adjacent the counter die along the entire circumference thereof, and when pressing the matrix and the counter die together there is a tension in the layer of wool, and this can lead to ruptures and displacement of material. The problems may be still greater if the formed body to be made is doubled curved, for instance cupola shaped.

Generally the difficulties increase with decreasing radius of curvature, and that the present technics does not allow a formation of perpendicular channels.

The present invention offers a solution of the above discussed problems and relates to a non-expensive and rational method for the manufacture of such moldings. Thus the invention relates to a method of the manufacture of one-dimensionally or more-dimensionally curved or angularly formed moldings of mineral wool which is impregnated with a binder in that a calculated piece of binder impregnated mineral wool felt is compressed between two die parts, a matrix and a counter die, whereupon the binder of the mineral wool body, provided in the matrix and the counter die, is fixed in that the matrix and/or the counter die gives its heat.

According to the invention the compression of the mineral wool felt is made in a first step between the counter die and a part of the matrix, whereupon the ramaining parts of the matrix in one or several successive steps is fold in to the mineral wool felt, so that all parts thereof are pressed to the counter die, whereby the mineral wool felt in all parts is given a predetermined thickness without any displacement of material.

For particularly complicated moldings it may be suitable to use a counter die which like the matrix comprises several portions which are successively placed into contact with the mineral wool felt while or after the portions of the matrix have been fold in to the mineral wool felt.

The part of the matrix which is first put into contact with the mineral wool felt to define a predetermined thickness thereof can be generatrix of the matrix or a part of the circumferance of the matrix preferably a central part thereof.

Generally it is preferable to provide the counter die lower than the matrix and to put the mineral wool felt into contact with the counter die and thereafter to lower the matrix to the mineral wool felt.

As a rule the best moldings are obtained if the compression is made so that the matrix as a whole is in contact with the mineral wool felt before the felt is finally pressed to the counter die. Thereby any breakings of the mineral wool felt is eliminated.

The invention also relates to an apparatus for executing the method. The characteristics of said apparatus is evident from the appended claims. The following description of preferred embodiments is illustrating the invention.

In the drawings

FIGS. 1A, 1B and 1C and FIGS. 2A, 2B, 2C and 2D diagrammatically show two different mold compression methods according to the invention.

FIG. 3 shows an apparatus for forming of a bowl-formed mineral body having edges.

FIG. 4 shows an apparatus for forming a roundly bowl formed mineral wool body.

Figure 1A:
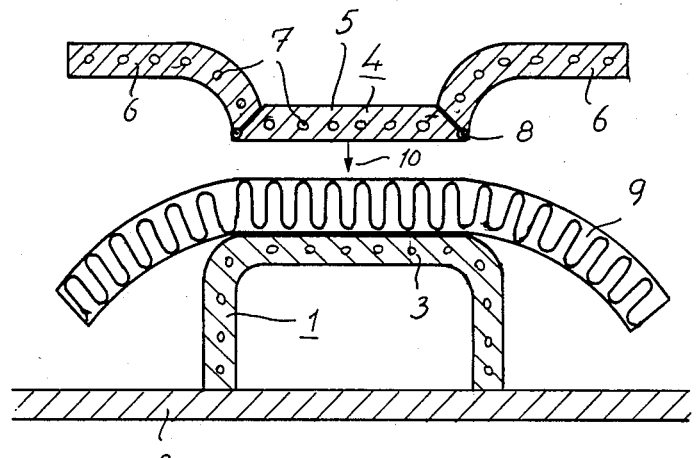
Figure 1B:
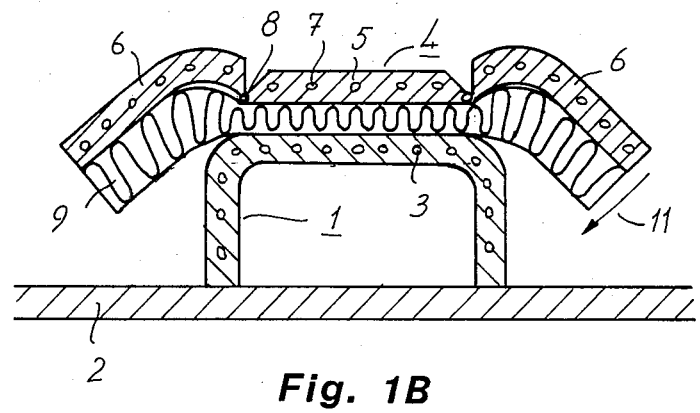
Figure 1C:
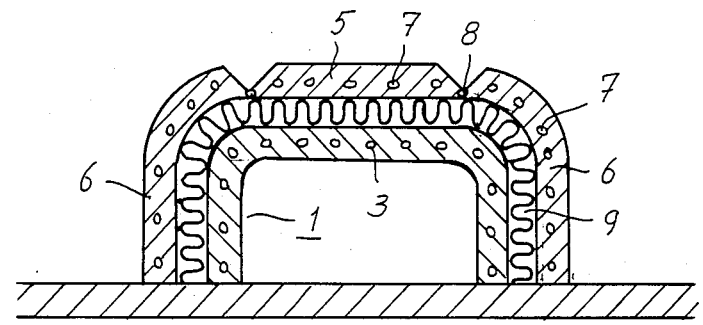

In FIGS. 1A, 1B and 1C numeral 1 is a counter die which is mounted on a fixed bottom plate 2. In the illustrated case the counter die is inversely U-shaped and is formed with channels 3 for supply of heat. The matrix 4 comprises a central portion 5 and two wings 6 which can be fold in relation to said central portion 5. Like in the counter die there are channels 7 in the portions of the matrix for supply of heat. The folding of the marix portions 5 and 6 in relation to each other is made over hinges 8 and a power means which is not shown in the drawing.

In executing the method a mineral wool felt 9 is placed over the counter die 1. The matrix 4 is than lowered to the mineral wool felt as the arrow 10 illustrates.

FIG. 1B shows the step in which the central matrix portion 5 has compressed the mineral wool felt 9 to its intended thickness. The two foldable matrix portions 6 have started their folding downwards to press the mineral wool felt inwards to the flange portions of the counter die or the vertical portions as shown with the arrows 11. In FIG. 1C the folding inwards of the mineral wool felt is completed and it has in all parts thereof obtained the predetermined thickness. In this stage the mineral wool is heated in that the heat supplied in the channels 3 and 7 is spreading into the mineral wool felt and thereby causes the binder to become cured so that the molding or formed body gets form stable. The heating and thereby the fixing can be accelerated in that a flow of air is forced through the mineral wool felt from the counter die to the matrix or vice versa. For making this it is necessary that both the counter die and the matrix are formed with through cross channels. The necessary amount of air for executing the method can be supplied from the space between the counter die 1 and the bottom plate 2. FIGS. 2A-2D generally shown an equivalent method. A counter die 12 comprising a central portion 13 and two completing potions 14 is fixed in the vertical direction in relation to a bottom plate 15. A matrix 16 comprising a central portion 17 and two side portions 18 which are foldable in relation to said central portion is mounted over the counter die. A mineral wool felt 19, which is calculated as far as length and width is concerned is put over the counter die 12, whereupon the matrix is lowered to the central portion 13 of the counter die as described above.

Figure 2A:
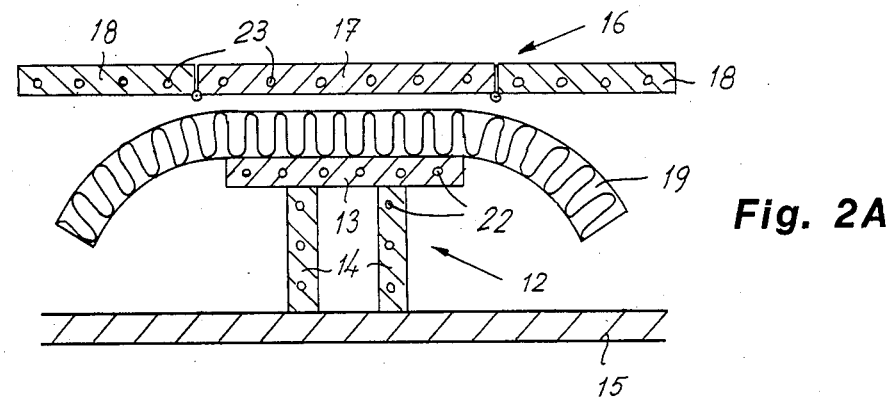
Figure 2B:
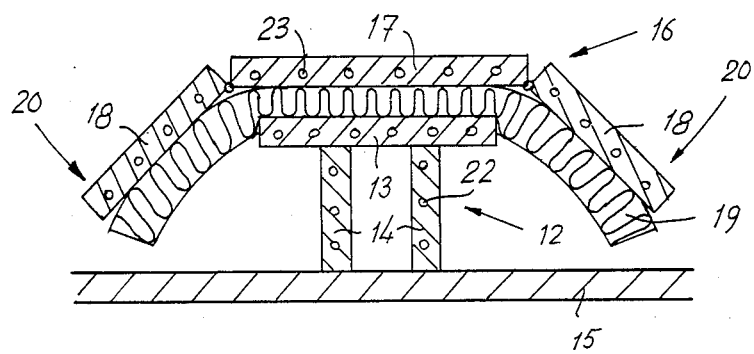

In FIG. 2B the central portion 17 has come so close to the central portion 13 of the counter die that the mineral wool felt 19 has obtained the intended thickness between said die portions. The two side portions 18 have started their folding down to the mineral wool felt as the arrows 20 indicate.

Figure 2C:
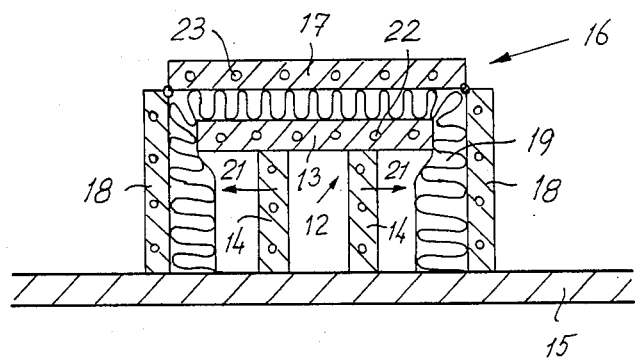

In FIG. 2C the side portions 18 of the matrix have been fold down to its final position. In this stage a moving out of the two vertical completing portions 14 of the counter die have started as the arrows 21 indicate.

Figure 2D:
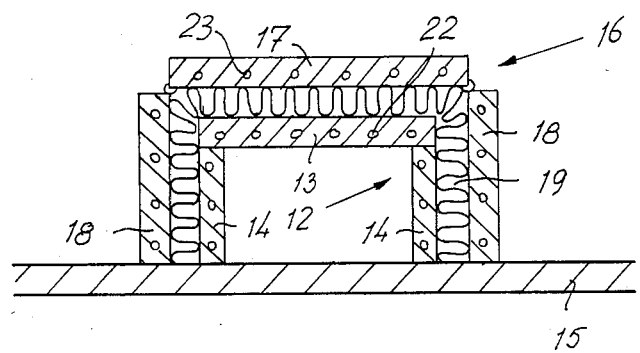

In FIG. 2D the situation is shown in which all die parts have taken their final positions and the curing of the binder can be started by heating of the mineral wool in that some type of heat is let through the channels 22 and 23 of the matrix and the counter die.

FIG. 3 shows an apparatus for shaping a die formed mineral wool body the shape of which is similar to that of the double hip roof. The counter die can be fixed whereas the matrix is formed with a central top portion 24 and two pairs of opposite side portions 25 and 26 which are hinge joined to said central portion and which provide a closed bowl form when moved together.

Correspondingly FIG. 4 shows a mineral wool bowl which is formed nearly as a semi bowl and having a central top portion 27 and several wings 28 which are hinge joined to said central portion and which are bow formed into planes and which provide a closed matrix mold when put together.

It is to be understood that the above description and the embodiments shown in the drawings are only illustrating examples and that all kinds of different modifications may be presented within the scope of the appended claims.

We claim:

1. In a method for the manufacture of non-planar arcuately shaped binder impregnated mineral wool felt mat (9; 19) compressing the mat between mold parts comprising a matrix (4; 16) and a counter die (1; 12), the improvement comprising: enabling an even distribution of material sufficient to provide a predetermined thickness in the felt, by compressing the felt in a plurality of stages including, compressing the mineral wool felt (9: 19) between the counter die (1; 12) and a central portion (4; 17) of the matrix (4; 16), whereafter folding the side portions (6; 18) of the matrix (4; 16) in at least one successive step, into contact with the mineral wool felt mat (9; 19) sufficient to provide said predetermined thickness.

2. Method according to claim 1, characterized in that the mineral wool felt is placed into contact with the counter die, whereupon a part of the matrix is put into contact with the mineral wool felt, so that said felt is presed to a predetermined thickness between the matrix and the counter die at least along a generatrix of the molding to be made whereafter the remaining part (6; 18) of the matrix (4; 16) in one or more successive step is fold into contact with the mineral wool felt (9; 19) thereby pressing also the remaining part of the mineral wool felt through the counter die (1; 12).

3. Method according to any of claims 2, characterized in that the application of the mineral wool felt (9; 19) to the counter die (1; 12) is made from above, and so is the application of the matrix (4; 16) to the mineral wool felt (9; 19).

4. Method according to claim 1, characterized in that the matrix as a complete is in contact with the mineral wool felt before the counter die as a complete comes into contact therewith.

5. Method according to claim 4, characterized in that portions (14) of the counter die (12) are fold or displaced outwards into contact with the mineral wool felt (19) at the same time as or after the folding in of the matrix portions (18).

* * * * *